US012486693B2

(12) United States Patent
Chen

(10) Patent No.: US 12,486,693 B2
(45) Date of Patent: Dec. 2, 2025

(54) VIOLENCE PROTECTION STRUCTURE OF DOOR HANDLE

(71) Applicant: Te-Yu Chen, Pingtung (TW)

(72) Inventor: Te-Yu Chen, Pingtung (TW)

( * ) Notice: Subject to any disclaimer, the term of this patent is extended or adjusted under 35 U.S.C. 154(b) by 61 days.

(21) Appl. No.: 18/633,466

(22) Filed: Apr. 11, 2024

(65) Prior Publication Data

US 2025/0320751 A1 Oct. 16, 2025

(51) Int. Cl.
*E05B 17/20* (2006.01)
*E05B 3/06* (2006.01)

(52) U.S. Cl.
CPC .......... *E05B 17/2084* (2013.01); *E05B 3/065* (2013.01)

(58) Field of Classification Search
CPC ... E05B 17/2084; E05B 15/1614; E05B 3/065
USPC .......................................................... 292/336.3
See application file for complete search history.

(56) References Cited

U.S. PATENT DOCUMENTS 4,569,547 A * 2/1986 Fayerman ............... E05B 3/065 292/DIG. 60
5,177,987 A * 1/1993 Shen ..................... E05B 55/005 292/336.5
5,305,695 A * 4/1994 Lichter ................. E05B 13/001 70/333 A
5,433,495 A * 7/1995 Uffner ..................... E05C 1/163 292/169.14
5,481,890 A * 1/1996 Millman ................. E05B 3/065 292/357
5,617,749 A * 4/1997 Park ........................ E05B 3/065 292/336.3
5,636,882 A * 6/1997 Hook ...................... E05B 3/065 292/336.3
5,727,406 A * 3/1998 Banducci ................ E05B 3/065 292/336.3
5,732,578 A * 3/1998 Kang ...................... E05B 3/065 292/357
5,761,936 A * 6/1998 Katayama ........... E05B 17/2084 292/358
5,813,708 A * 9/1998 Shen ....................... E05B 15/04 292/336.3
5,916,281 A * 6/1999 Kester ................... E05B 13/101 70/472
6,357,270 B1 * 3/2002 Vazquez ............... E05C 9/1808 292/336.3

(Continued)

*Primary Examiner* — Nathan Cumar
(74) *Attorney, Agent, or Firm* — Leong C. Lei

(57) ABSTRACT

A door handle violence protection structure includes a base, and a bottom plate having a rotating block, a door-handle rotating member, a positioning member, upper and lower spring plates, and a spring case arranged on the base. The bottom plate includes a trough portion. The bottom plate and the upper and lower spring plates are arranged in a trough portion. The door-handle rotating member is provided with an axle portion and the axle portion extends through the bottom plate and rotatably combined with the spring case, so that the bottom plate is rotatable by means of the handle rotating member. As such, when locked, the bottom plate forms a blocked state and the upper spring plate forms a resisting and pressing member so that the door handle forms an idle rotation state that allows for idle rotation to a predetermined angle but does not cause any operation of the lockset.

5 Claims, 7 Drawing Sheets

(56) References Cited

U.S. PATENT DOCUMENTS

| | | | | |
|---|---|---|---|---|
| 8,844,330 | B2 * | 9/2014 | Moon | E05B 55/005 292/336.3 |
| 9,394,722 | B2 * | 7/2016 | Moon | E05B 63/16 |

* cited by examiner

VIOLENCE PROTECTION STRUCTURE OF DOOR HANDLE

BACKGROUND OF THE INVENTION

(a) Technical Field of the Invention

The present invention relates to a violence protection structure of a door handle, and more particularly to a door handle violence protection structure that is set in an idle rotation state in a locked condition and is set in a retained engagement state in a condition of an external invasion force attempting to make upward pulling of a door handle for purpose of breaking.

(b) Description of the Prior Art

In addition to commonly known components, such as square bolt and triangular bolt, a known lockset structure includes a locking bolt operatively in combination with a latch bolt. In a normal state, rotating a handle or a key causes the lockset to turn into a state of being locked with the bolt and the door cannot be rotated to open. To lock the known lockset after entry, the operation of the known lockset is such that the rotary axle located in the indoor side is operated to fulfill locking, and for exiting or entry into the indoor side, a key is used to lock and unlock the lockset, and after unlocking, the door handle has to be rotated by a given angle before the door can be opened. To better the security and burglarproofness of locksets, some locksets are structured to allow the bolt to fit into a door frame for not closing, but no other measures have been taken to enhance resistance against burglary.

With the progress of technology and materials, the state-of-the-art locksets have increasingly upgraded robustness and security performance. When a lockset is in a locked state, if unauthorized persons attempt to break in, due to the difficulty of opening the lockset, the unauthorized persons may adopt violence to forcibly break in, and this may result in the entire lockset being broken. Although this may be proven effective for resisting burglary, yet damage of the lockset and door handle may still cost a lot. In view of this, the present invention aims to provide a violence protection structure of a door handle, which enables idle rotating in case of being locked and forms a retained engagement state in case of an external invasion force being applied to pull upwards the handle for the purpose of damaging, so as to prevent the lockset and the door handle from being damaged.

SUMMARY OF THE INVENTION

The primary objective of the present invention is to provide a violence protection structure of a door handle, which, in a condition of being locked, forms an idle rotation state during rotating of a door handle to generate a false impression that the door handle is broken and malfunctioning, and which, in a condition that an external invasion force pulls upward the door handle for the purpose of damaging, forms a retained engagement state to prevent the lockset and the door handle from being intentionally damaged in order to fulfill the purpose of violence protection.

The above-mentioned violence protection structure of a door handle comprises a base, and a bottom plate comprising a rotating block, a door-handle rotating member, a positioning member, an upper spring plate, a lower spring plate, and a spring case arranged on the base. The bottom plate comprises a trough portion. The bottom plate and the upper and lower spring plates are arranged in a trough portion of the base. The door-handle rotating member is provided with an axle portion and the axle portion extends through the bottom plate and rotatably combined with the spring case, so that the bottom plate is rotatable by means of the handle rotating member. As such, when locked, the bottom plate forms a blocked state and the upper spring plate forms a resisting and pressing member so that the door handle forms an idle rotation state that allows for idle rotation to a predetermined angle but does not cause any operation of the lockset, and when an external invasion force attempts to pull upward the door handle for damaging it, the lower spring plate forms blocking and will sprung off, if the pressing force is excessively large, to have the door-handle rotating member pressed down, resulting in a retained state. When the lock is in an opened state, the door handle presses down the upper spring plate and drives the bottom plate and the lower spring plate and a triangular bolt of the lockset to move, and when rotated to a predetermined angle, the positioning member is brought into contact with the rotating block of the bottom plate to have the lockset opened.

In the above-described violence protection structure of a door handle, a projection spot is formed on the board of the door-handle rotating member at a location corresponding to the axle; and a recess is formed in one end of the rotary square iron member, so that the rotary square iron member is extendable through the penetrating hole of the bottom plate to have the projection spot fit into and engaging with the recess in order to position the door-handle driving member at the rotation center point for rotating the bottom plate.

In the above-described violence protection structure of a door handle, the bottom plate is formed, in a center thereof, with a square penetrating hole, and is provided with an upper stop member and a lower stop member at upper and lower sides of the penetrating hole and a lateral stop member at a lateral side; the opposite end of the upper spring plate is provided with a bracing portion and a supporting portion, such that the bracing portion braces against the upper stop member of the bottom plate and the supporting portion supported on the lateral stop member of the bottom plate.

In the above-described violence protection structure of a door handle, a compression spring is fit to the lower stop member of the bottom plate to provide supporting to the rod portion of the positioning member.

In the above-described violence protection structure of a door handle, the compression spring is of a curly form having a frame portion formed in a center thereof, so that the frame portion is positionable over and loops around the lower stop member of the bottom plate.

DETAILED DESCRIPTION OF THE PREFERRED EMBODIMENTS

Figure 1:
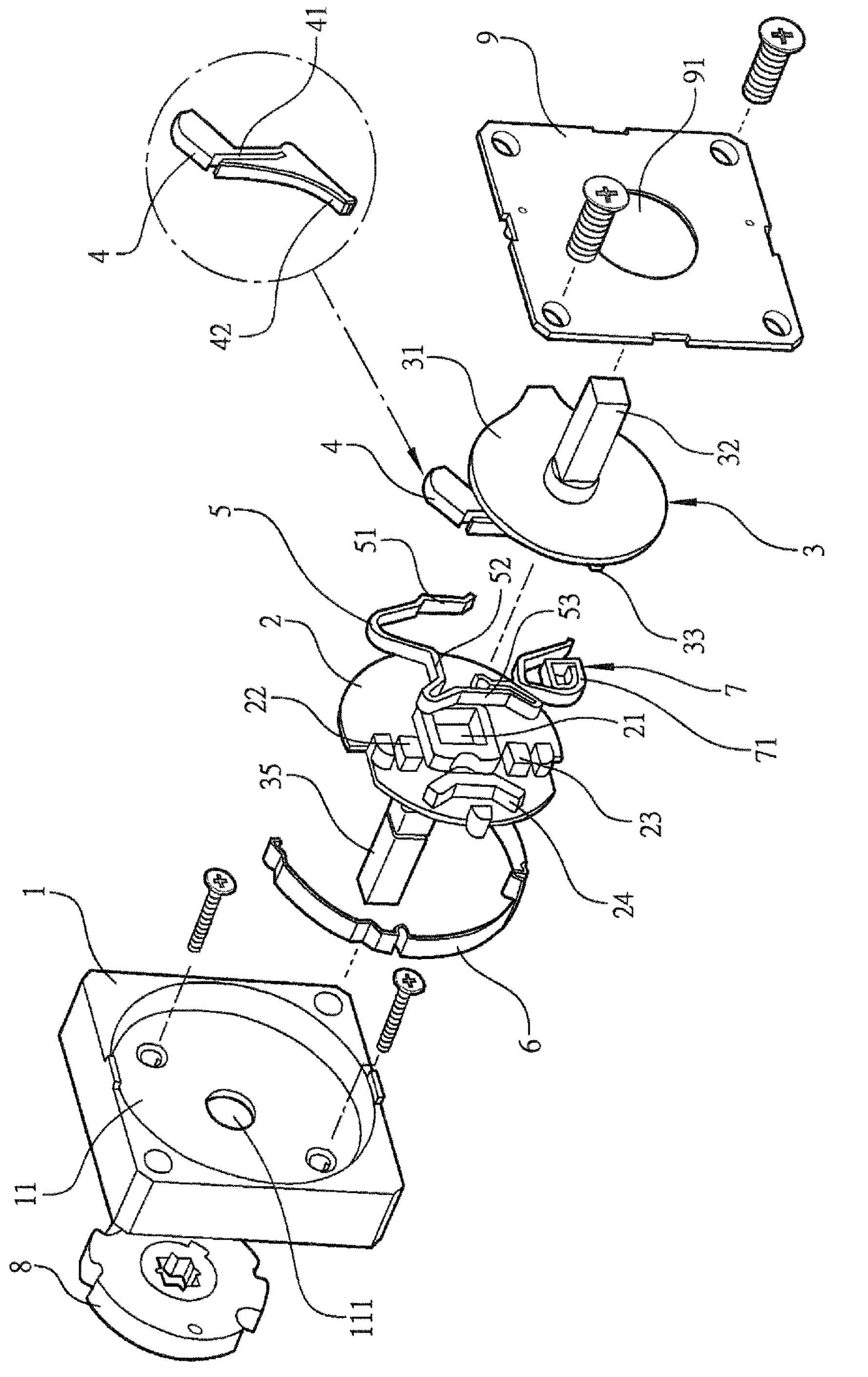
FIG. 1 is an exploded view of the present invention.
Figure 2:
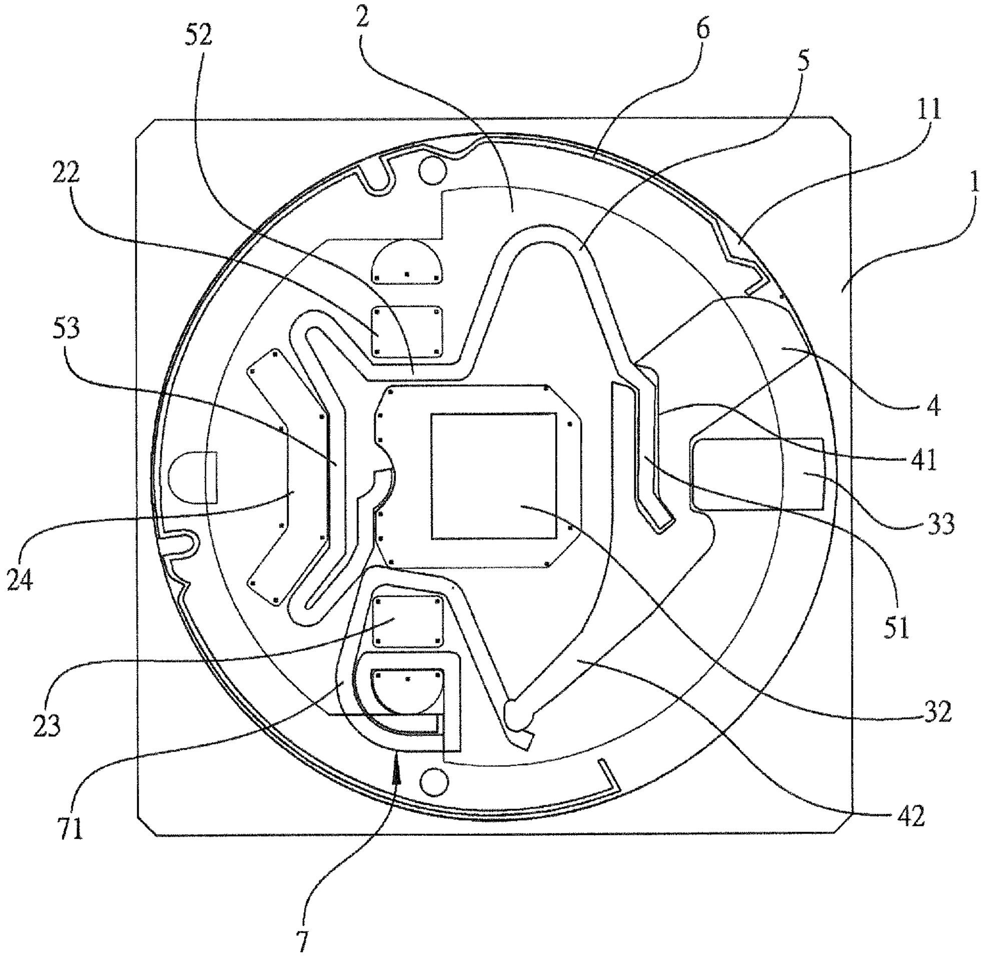
FIG. 2 is a structure diagram of the present invention.
Figure 3:
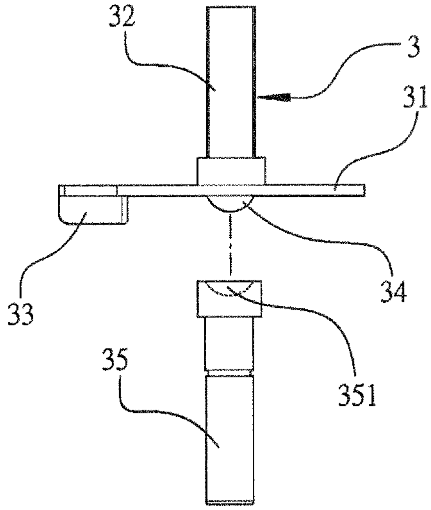
FIG. 3 is a structure diagram of a door-handle rotating member of the present invention.
Figure 4:
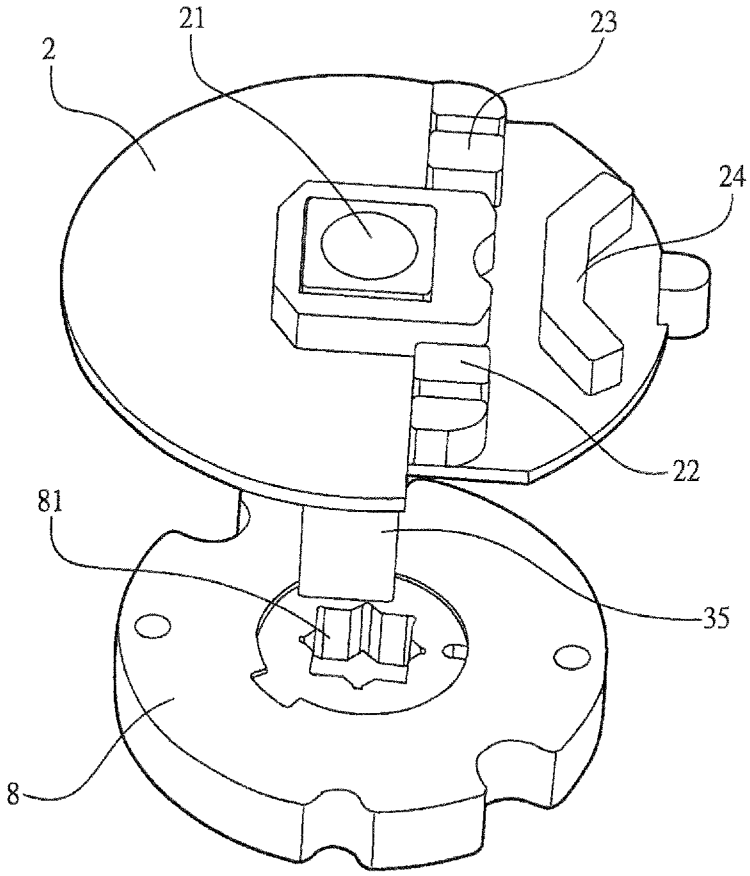
FIG. 4 is an exploded view of a bottom plate and a spring case of the present invention.

Referring jointly to FIGS. 1 and 2, which are respectively an exploded view and a structure diagram of the present invention, with additional reference being had to FIGS. 3 and 4, which are respectively a structure diagram of a door-handle rotating member of the present invention and an exploded view of a bottom plate and a spring case of the present invention, as shown in the drawings, the present invention comprises a base 1, and a bottom plate 2, a door-handle rotating member 3, a positioning member 4, an upper spring plate 5, a lower spring plate 6, a compression spring 7 and a spring case 8 arranged in the base 1, and a top cover 9. The base 1 is formed with a trough portion 11, and a through hole 111 is formed in a center of the trough portion 11.

The bottom plate 2 is formed, in a center thereof, with a penetrating hole 21, which is square or rectangular, and is provided with an upper stop member 22 and a lower stop member 23 at upper and lower sides of the penetrating hole 21 and a lateral stop member 24 at a lateral side.

The door-handle rotating member 3 comprises a board 31, an axle 32 being arranged on the board 31, a rotating block 33 being also arranged on the board 31, a projection spot 34 being formed on the board 1 at a location corresponding to the axle 32; and a rotary square iron member 35, a recess 351 being formed in an end of the rotary square iron member 35, so that the rotary square iron member 35 is extendable through the penetrating hole 21 of the bottom plate 2 to have the projection spot 34 fit into and engaging with the recess 351 in order to position the door-handle driving member 3 at a rotation center point for rotating the bottom plate 2.

The positioning member 4 is formed with a fitting slot 41 and has a lower portion extended to form a slender rod portion 42.

The upper spring plate 5 is of a successively curved configuration having one end that is provided with a mounting portion 51 to be fit into and mounted in the fitting slot 41 of the positioning member 4 and an opposite end that is provided with a bracing portion 52 and a supporting portion 53, the bracing portion 52 bracing against the upper stop member 22 of the bottom plate 2, the supporting portion 53 supporting on the lateral stop member 24 of the bottom plate 2.

The lower spring plate 6 is generally of a C-shape which is wound along a circumference of the trough portion 11 of the base 1.

The compression spring 7 is of a curly form having a frame portion 71 formed in a center thereof, so that the frame portion 71 is positionable over and loops around the lower stop member 23 of the bottom plate 2 to provide supporting to the rod portion 42 of the positioning member 4.

The spring case 8 is formed, in a center thereof, with a fitting hole 81, so that the rotary square iron member 35 is extendable through the through hole 111 of the trough portion 11 of the base 1 to insert into and retained in the fitting hole 81.

The top cover 9 is formed with a through hole 91.

With the above-described components assembled together, the bottom plate 2, the door-handle rotating member 3, the positioning member 4, the upper spring plate 5, the lower spring plate 6, and the compression spring 7 are located in the trough portion 11 of the base 1, and the top cover 9 is set on to cover and fix to the base 1, while the axle 32 of the door-handle rotating member 3 penetrate through and out of the through hole 91 to join to a door handle. When locked, the bottom plate 2 forms a blocked state to make the upper spring plate 5 forming a resisting and pressing member so that the door handle forms an idle rotation state that allows for idle rotation to a predetermined angle but does not cause any operation of the lockset. When an external invasion force attempts to pull upward the door handle for damaging it, the lower spring plate 6 form blocking, but will be sprung off, if the pressing force is excessively large, to have the door-handle rotating member pressed down, resulting in a retained state. When the lock is in an opened state, the door handle presses down the upper spring plate 5 and drives the bottom plate 2 and the lower spring plate 6 and the triangular bolt of the lockset to move, and when rotated to a predetermined angle, the positioning member 4 is brought into contact with the rotating block 33 to have the lockset opened. As such, a false impression that the lockset and the door handle are broken and malfunctioning is induced, and when an external invasion force attempts to pull upward the door handle to damage it, a retained state is induced to prevent the lockset and door handle from being intentionally damaged to thereby fulfill the purpose of violence protection.

Figure 5:
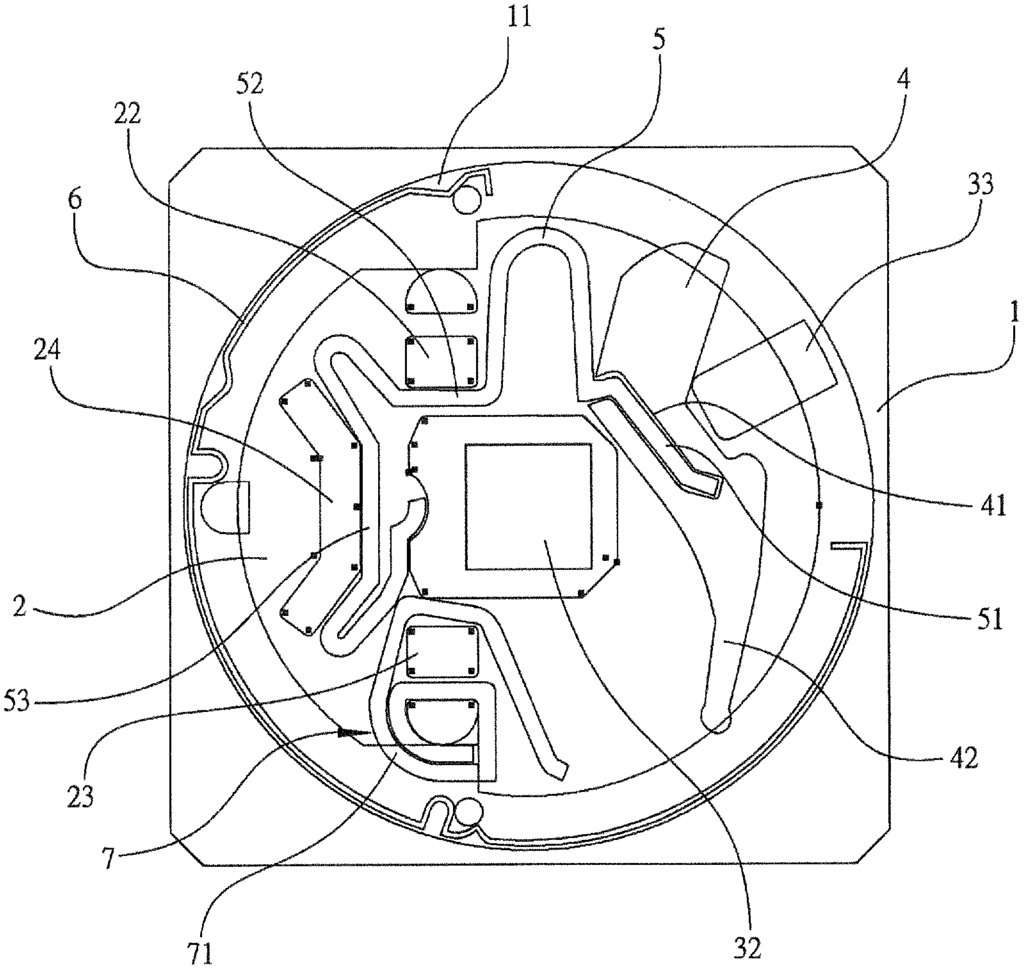
FIG. 5 is a schematic view showing an idle rotation state of the present invention.

Referring to FIG. 5, which is a schematic view showing an idle rotation state of the present invention, as shown in the drawing, the present invention is such that when the door is in a locked state, the bottom plate 2 exhibits a blocked state and only the upper spring plate 5 forms a resisting and pressing member, the door handle being idle-rotatable to a predetermined angle, but incapable of driving the lock to operate, and during upward rotation, since the interior lock body is in a closed state, when the upper spring plate 5 is compressed to a predetermined angle to induce an idle rotation state, the door handle is pushed down to become idle rotating due to the spring force of the lower spring plate 5, and if the pushing down becomes overloading, the positioning member 4 is rotated to have the door-handle rotating member 3 rotating down, and if no force is specifically applied to rotate back and return the door-handle rotating member 3, the positioning member 4 blocks the door-handle rotating member 3, so as to result in a false impression of the door handle being broken and malfunctioning.

Figure 6:
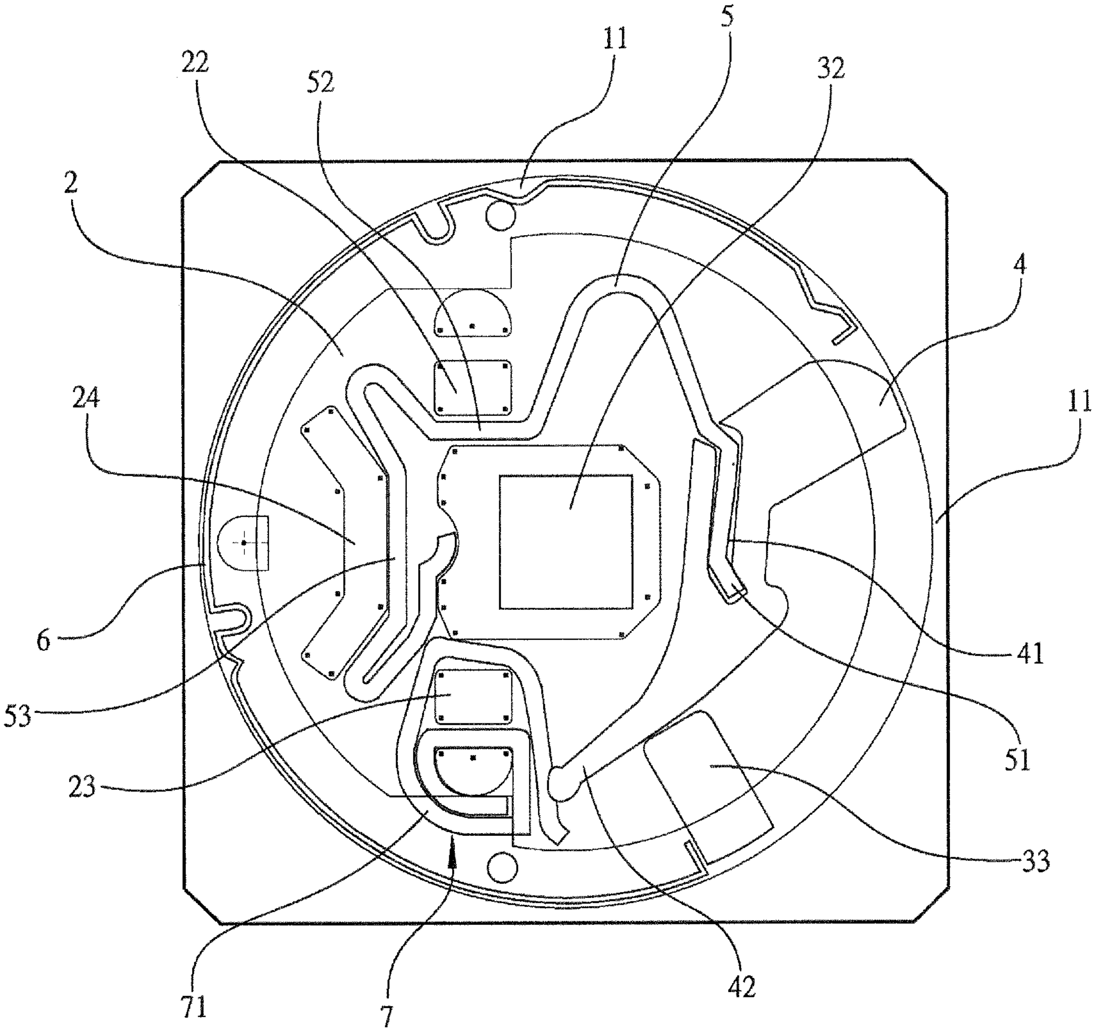
FIG. 6 is a schematic view showing an engaging and retained state of the present invention.

Referring to FIG. 6, which is a schematic view showing an engaging and retained state of the present invention, as shown in the drawing, the present invention is such that in a upward-pulling blocked state, the lockset is locked to set the bottom plate 2 in a blocked state, and when an external invasion force attempts to pull the door handle upward to damage the spring case 8 and the lockset, the lower spring plate 6 forms a blocking member. If the pressing force is excessively large, the lower spring plate 6 becomes sprung back to thereby make the door-handle rotating member 3 pressed down to result in a retained state.

Figure 7:
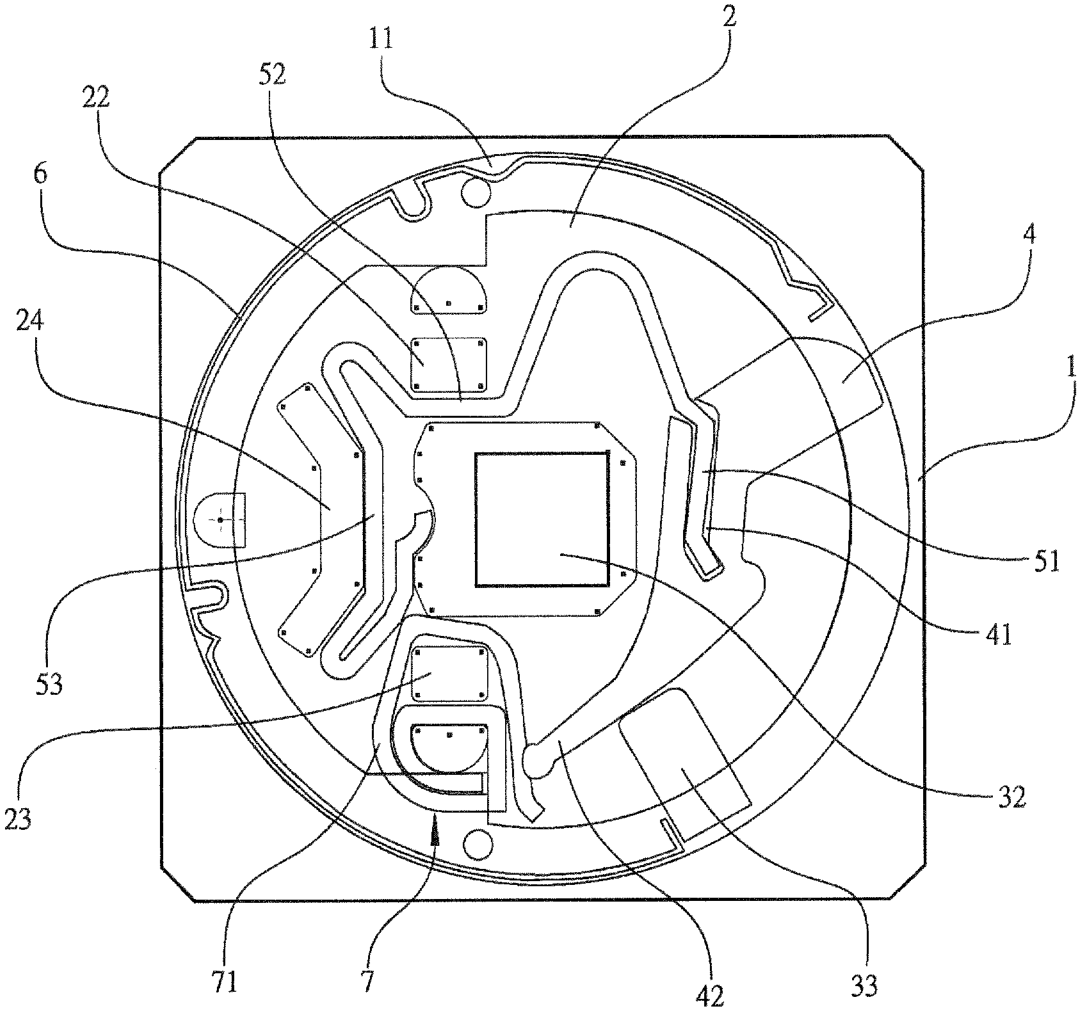
FIG. 7 is a schematic view showing an opened state of the present invention.

Referring to FIG. 7, which is a schematic view showing an opened state of the present invention, as shown in the drawing, the door handle pressing down the lower spring plate 6 drives the bottom plate 2, the rotary square iron member 35, and the lower spring plate 6, and a triangular bolt of the lockset to move. When rotated to a predetermined angle, the positioning member 4 abuts the bottom plate 2 to have the door opened. In other words, when rotation achieves a given angle, the positioning member 4 is brought into contact with the rotating block 33 of the door-handle rotating member 3 to thereby rotate the triangular bolt of the lockset.

In either an opening or closing operation state as described above, the positioning member 4 will hold up the door-handle rotating member 3, and the positioning member 4 is downward pressable to rotate so as to retain the door handle as the known locksets. And, when the door handle is pulled upward, the door handle is caused to return to the original location. In other words, the operation of the positioning member 4 makes the door handle restoring a leveled state.

In summary, the present invention provides a door handle violence protection structure that is formed of the base that is provided with the bottom plate, the door-handle rotating member, the positioning member, the upper spring plate, the lower spring plate, and the compression spring, in combination with the spring case to which the door-handle rotating member is rotatably connected and the top cover that is set on and covering the base. The door handle, when rotated in a locked condition, generates an idle rotation state so as to induce a false impression that the door handle is broken and malfunctioning. When an external invasion force attempts to pull upward the door handle for damaging it, a retained and fixed state is generated to prevent the lockset and the door handle from being intentionally damaged to thereby achieve the purpose of violence protection. This is a practical design and is a novel invention, and an application for a patent is thus filed to pursue patent protection.

I claim:

1. A door handle violence protection structure, comprising:

a base, which is formed with a trough portion, a through hole being formed in a center of the trough portion;

a bottom plate, which is arranged in the trough portion of the base and is formed, in a center thereof, with a penetrating hole that is square, and is provided with an upper stop member and a lower stop member at upper and lower sides of the penetrating hole and a lateral stop member at a lateral side;

a door-handle rotating member, which is arranged in the trough portion of the base and comprises a board, an axle being provided on the board, a rotating block being provided on the board, the axle being rotatably connected with a rotary square iron member to position the door-handle driving member at a rotation center point for rotating of the bottom plate;

a positioning member, which is arranged in the trough portion of the base and is formed with a fitting slot, and has a lower portion extended to form a slender rod portion;

an upper spring plate, which is arranged in the trough portion of the base and is of a successively curved configuration having one end that is provided with a mounting portion to be fit into and mounted in the fitting slot of the positioning member and an opposite end bracing against the upper stop member of the bottom plate and supporting on the lateral stop member of the bottom plate;

a lower spring plate, which is of a C-shape which is wound along a circumference of the trough portion of the base; and a spring case, which is formed, in a center thereof, with a fitting hole, so that the rotary square iron member is extendable through the through hole of the trough portion of the base to insert into and retained in the fitting hole.

2. The door handle violence protection structure according to claim 1, wherein a projection spot is formed on the board of the door-handle rotating member at a location corresponding to the axle; and a recess is formed in one end of the rotary square iron member, so that the rotary square iron member is extendable through the penetrating hole of the bottom plate to have the projection spot fit into and engaging with the recess in order to position the door-handle driving member at the rotation center point for rotating the bottom plate.

3. The door handle violence protection structure according to claim 1, wherein the opposite end of the upper spring plate is provided with a bracing portion and a supporting portion, such that the bracing portion braces against the upper stop member of the bottom plate and the supporting portion supported on the lateral stop member of the bottom plate.

4. The door handle violence protection structure according to claim 1, wherein a compression spring is fit to the lower stop member of the bottom plate to provide supporting to the rod portion of the positioning member.

5. The door handle violence protection structure according to claim 4, wherein the compression spring is of a curly form having a frame portion formed in a center thereof, so that the frame portion is positionable over and loops around the lower stop member of the bottom plate.

* * * * *